United States Patent [19]

Mogul

[11] Patent Number: 5,790,799
[45] Date of Patent: Aug. 4, 1998

[54] SYSTEM FOR SAMPLING NETWORK PACKETS BY ONLY STORING THE NETWORK PACKET THAT ITS ERROR CHECK CODE MATCHES WITH THE REFERENCE ERROR CHECK CODE

[75] Inventor: Jeffrey Clifford Mogul, Menlo Park, Calif.

[73] Assignee: Digital Equipment Corporation, Maynard, Mass.

[21] Appl. No.: 871,059

[22] Filed: Jun. 9, 1997

Related U.S. Application Data

[63] Continuation of Ser. No. 443,299, May 17, 1995, abandoned.

[51] Int. Cl.[6] .................................................. G06F 13/00
[52] U.S. Cl. ........................... 395/200.54; 395/200.53; 395/835; 395/837; 395/838; 371/30
[58] Field of Search ..................... 395/200.54, 200.53, 395/835, 837, 838; 371/30

[56] References Cited

U.S. PATENT DOCUMENTS

| | | | |
|---|---|---|---|
| 4,486,877 | 12/1984 | Turner | 370/249 |
| 5,101,402 | 3/1992 | Chiu et al. | 395/200.54 |
| 5,247,517 | 9/1993 | Ross et al. | 370/452 |
| 5,315,580 | 5/1994 | Phaal | 370/232 |
| 5,467,359 | 11/1995 | Huon et al. | 371/37.4 |
| 5,515,376 | 5/1996 | Murthy et al. | 370/402 |

OTHER PUBLICATIONS

Dravida et al. "Error Performance of IEEE 802.6 Metropolitan Area Networks", 1990, pp. 105–115.

Cheng et al. "ISDN Access Line Data Link Layer & Network Layer Maintenance", 1988, pp. 362–366.

*Primary Examiner*—Frank J. Asta
*Assistant Examiner*—Le Hien Luu
*Attorney, Agent, or Firm*—Michael A. Rodriguez; Ronald C. Hudgens

[57] ABSTRACT

In a computer network, a method of random sampling of network packets is provided including the steps of providing a network switch, providing a monitoring device, the monitoring having a memory and a data storage unit, providing a network interface to connect the network switch to the monitoring switch, selecting a reference error check code value in the monitoring device, receiving a first network packet from the network switch, comparing, in the network monitoring device, the reference error check code with an error check code of a first network packet, storing the first network packet in the monitoring device if the error check code value of the first network packet matches the reference error check code of the first network packet, and repeating the steps of receiving, comparing and storing for subsequent network packets. In such a method, the reference error check value may be selected from a first network packet, or from one of any of the plurality of network packets received, whether previous to or subsequent to, any particular received network packet.

20 Claims, 5 Drawing Sheets

SYSTEM FOR SAMPLING NETWORK PACKETS BY ONLY STORING THE NETWORK PACKET THAT ITS ERROR CHECK CODE MATCHES WITH THE REFERENCE ERROR CHECK CODE

This application is a continuation of application Ser. No. 08/443,299 filed on May 17, 1995, now abandoned.

FIELD OF THE INVENTION

The present invention relates to computer networks, and more particularly, to an efficient method for random sampling of network packets.

BACKGROUND OF THE INVENTION

In general, a computer network is an interconnected connection of autonomous computers. The computer network allows these computers to exchange information and share resources such as files, printers, modems, and storage units. Typically, data transmitted from computer to computer in the network consists of the transmission of data packets and is referred to in the art as traffic. Traffic on the computer network is typically monitored to collect information about the computer network and the traffic on the computer network. More specifically, network managers typically use passive network monitors to collect statistical information and debugging information about packets on the computer network. Passive techniques completely avoid perturbing the network traffic and do not require modifications to network devices such as host computer systems or network routers.

As is well known in the art, passive monitoring techniques are only feasible on computer networks where all the packets are visible at a single point. An example of such a network is bus-based local area networks (LAN) such as Ethernet, and ring networks such as FDDI. However, modern networks, such as asynchronous transfer mode (ATM) networks, and switch-based Ethernet and FDDI, use centralized switching to allow higher aggregate traffic rates than could be carried on any one link of the computer network. This means that there is no longer any single point in the computer network to observe all the packets, except in the switch itself.

As is also well known in the art, observing the traffic at the switch is not passive because it requires modifying the switch, and probably using the resources of the switch. In addition, if the network manager wants to monitor the full traffic flow through a switch with N links at X bits per second, the network manager would need a link of N times X bits per second to funnel the data to a monitoring subsystem. This is very expensive so as to make it almost infeasible.

Many statistics gathering applications might work with a properly chosen sample of packets, but this would not be useful for debugging applications. A sampled stream of packets would require far less of the resources of the switch, and would not require a super high-speed link to deliver the packets to the monitor.

To be useful, a sampled set of packets has to be representative of the full packet flow.

SUMMARY OF THE INVENTION

In accordance with the present invention, a method in a computer network for random sampling of a plurality of network packets, each of the plurality of network packets containing a unique error check value, is provided including the steps of providing a network switch, providing a monitoring device, the monitoring having a memory and a data storage unit, providing a network interface to connect the network switch to the monitoring switch, selecting a reference error check code value in the monitoring device, receiving a first network packet from the network switch, comparing, in the network monitoring device, the reference error check code with an error check code of a first network packet, storing the first network packet in the monitoring device if the error check code value of the first network packet equals the reference error check code of the first network packet, and repeating the steps of receiving, comparing and storing for subsequent network packets. With such an arrangement, the sampled set of packets is representative of the full packet flow in the computer network.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
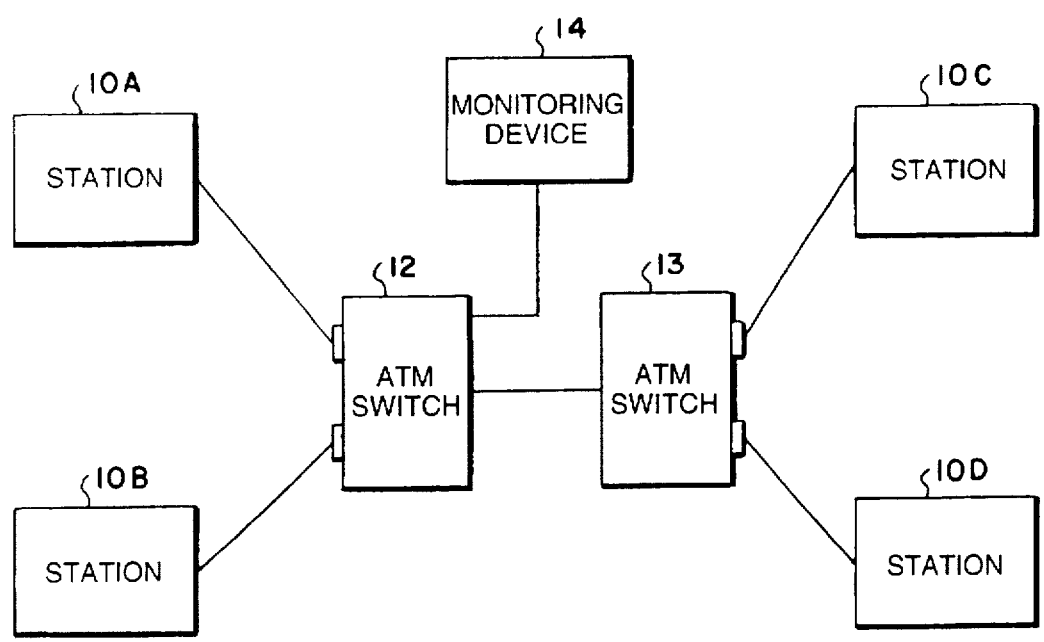
FIG. 1 is a block diagram of an exemplary asynchronous transfer mode (ATM) network containing a sampling device in accordance with the present invention.

Referring to FIG. 1, an exemplary asynchronous transfer mode (ATM) local area network (LAN) is shown to include four stations labeled 10A, 10B, 10C, and 10D. The exemplary ATM LAN is also shown to include two ATM switches labeled as 12 and 13, respectively. The exemplary ATM LAN is also shown to include a monitoring device 14 connected to the ATM switch. By way of example, packets of data (not shown) may be transferred from station 10A to station 10D in the following manner. Packets of data are sent from station 10A to ATM switch 12, then to ATM switch 13, and out to station 10D. While the packets of data are passing through ATM switch 12, they are monitored by the monitoring device 14.

Figure 2:
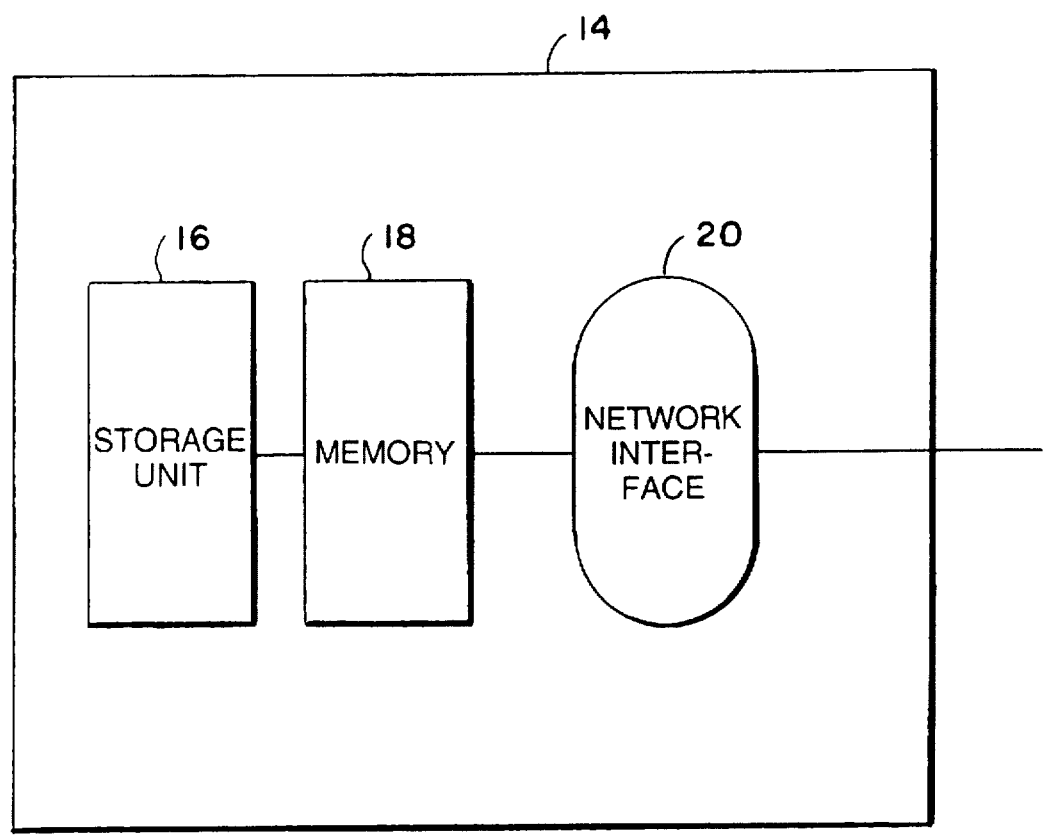
FIG. 2 is a block diagram of the network monitoring device of FIG. 1.

Referring to FIG. 2, the monitoring device 14 of FIG. 1 is shown to include a storage unit 16 connected to a memory 18 and a network interface 20. The network interface 20 provides connection of the network monitoring device 14 to the ATM switch 12 of FIG. 1.

Figure 3:
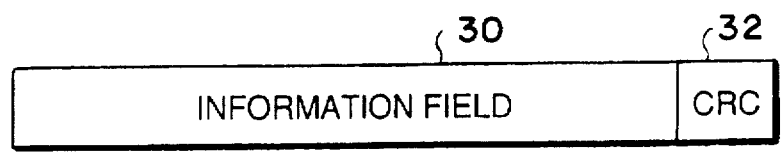
FIG. 3 is a block diagram of an exemplary message filed with CRC.

Each of the packets of data being transferred in the exemplary ATM LAN of FIG. 1 may occur in any of several formats. Referring to FIG. 3, an exemplary data packet is shown to include an information field 30 and a cyclic redundancy check (CRC) field 32. The customary way of determining the validity of a message in the information field 30 is for a receiver to perform a mathematical operation upon the incoming data in the information field 30, i.e., calculate a cyclic redundancy check or CRC, and compare the results of that calculation with the calculation results sent by the transmitting station at the end of the message in the CRC field 32. Depending on how the comparison is done and the type of local area network, the desired result may be all zeros or some predetermined value.

CRC calculation may be performed in hardware or in software. A particular CRC calculation that produces a 32-bit result has been rarely found to improperly indicate that a complexly altered message is correct. This CRC calculation may be implemented as a single large scaled integrated (LSI) part, or in software with exclusive-OR instructions and tables.

The present method takes advantage of the fact that most network packet formats, as shown and described with reference to FIG. 3, include a header error check code or Cyclic Redundancy Check (CRC) over the entire packet. Although these check codes are not cryptographically strong, the present invention assumes that they are essentially random in practice. That is, there is no strong correlation between the check code values and the semantics of the packet.

Referring again to FIG. 1, before packets of data are sent through ATM switch 12, an error check code reference value is selected by the monitoring device 14. Then, as packets of data flow through ATM switch 12, each of their individual error check codes are compared to the error check code reference value in the monitoring device 14. If the packet check code matches the error check code reference value, the packet is copied and stored in the storage unit 16 of the monitoring device 14. Alternatively, if the packet of data passing through the ATM switch 12 does not contain an error check code, the memory 18 of the monitoring device 14 is capable of calculating its error check code and then comparing it to the error check code reference value.

Figure 4:
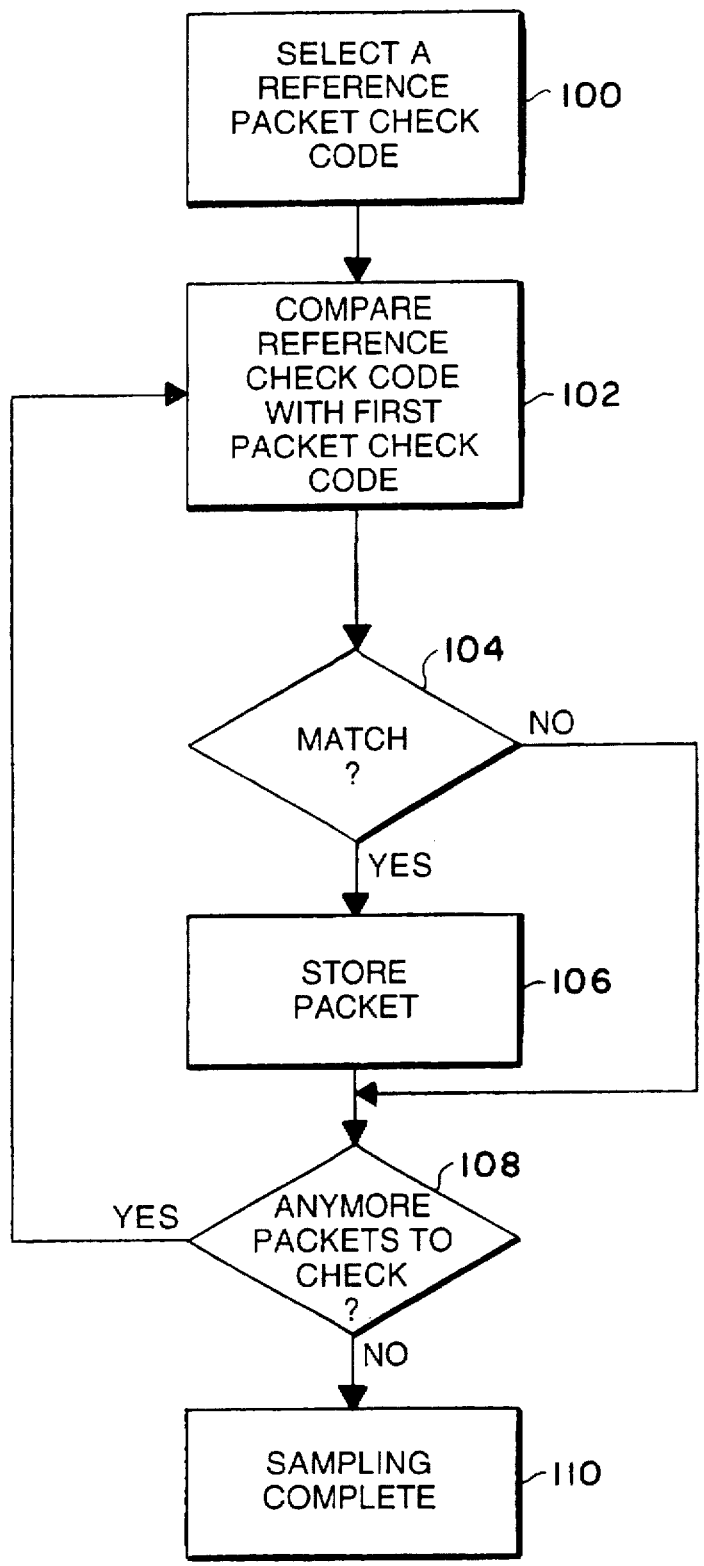
FIG. 4 is block diagram of a flow chart of a first embodiment of the present invention.

Referring now to FIG. 4, the method of the present invention is shown in block format. At step 100, an error check code reference value is selected by the monitoring device. At step 102, the monitoring device receives a packet of data and compares the received packet error check code and the check code reference value. At step 104, the process determines whether a match has occurred. The match need not be mathematical identity. In fact, if the CRC codes are large and truly random, looking for an exact match would yield very low sampling rates. Instead, in the preferred embodiment, "match" is understood to mean "some efficiently computed Boolean function of the two codes yields 'true'." Such functions include simple equality checks, and also include, as an example, comparison of bit fields. Moreover, the comparison function can be chosen to yield approximately any desired sampling rate, by changing the matching rate. If the two check codes match, at step 106 the received packet is stored in the storage unit of the monitoring device. If no match occurs, then at step 108 the monitoring device determines whether there is another packet to compare. If there is another packet to compare, the process repeats steps 102 through 108. If no more packets need to be checked, at step 110 sampling is complete.

Figure 5:
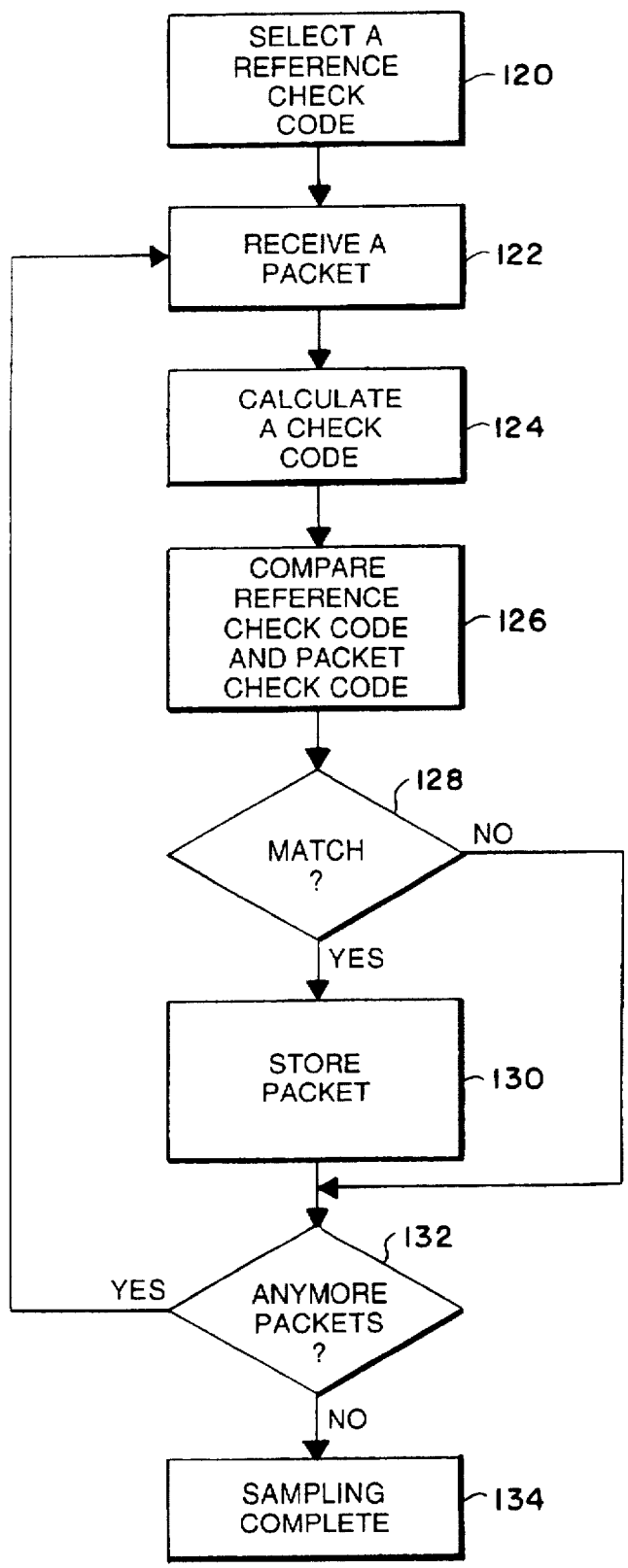
FIG. 5 is a block diagram of a flow chart of an alternate embodiment of the present invention.

Referring to FIG. 5, a second embodiment of the present invention is shown in block format. At step 120, an error check code reference value is selected by the monitoring device. At step 122, a packet is received by the monitoring device from the network. At step 124, the monitoring device calculates a packet check code for the received packet. At step 126, the monitoring device compares the error check code reference value with the calculated error check code value of the received packet. At step 128, the monitoring device determines whether a match of the calculated packet error check code and the check code reference value has occurred. If the two check codes match, at step 130 the packet is stored in the storage unit of the monitoring device. If no match occurs, then at step 132 the monitoring device determines whether there is another packet to compare. If there is another packet to compare, the process repeats steps 122 through 132. If no more packets need to be checked, at step 134 sampling is complete.

In another aspect of the present invention, the output of the comparing step 126 may be used to control the sampling of future packets, rather than the packet whose value was fed into the matching step. This may be of use if the ATM switch needs to start duplicating a sampled packet early in the receiving process, but the check code value appears at the end of the packet (or the internally calculated value appears after the entire packet is processed).

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method in a computer network for random sampling of a plurality of network packets, the method comprising the steps of:

providing a network switch for receiving the network packets;

providing a monitoring device, the monitoring device having a memory and a data storage unit;

providing a network interface to connect the network switch to the monitoring device, the monitoring device receiving network packets from the network switch;

selecting a reference error check code in the monitoring device;

comparing, in the monitoring device, the reference error check code with an error check code of each network packet received by the monitoring device; and selecting a sample of network packets from the network packets received by the monitoring device by storing each received network packet in the monitoring device if the error check code of that network packet matches the reference error check code.

2. The method in a computer network for random sampling of a plurality of network packets according to claim 1 wherein the reference error check code is selected from a first network packet.

3. The method in a computer network for random sampling of a plurality of network packets according to claim 1 wherein the reference error check code is selected from one of any of the plurality of network packets.

4. The method in a computer network for random sampling a plurality of network packets according to claim 1 wherein the error check code of a particular network packet matches the reference error check code when that error check code equals the reference error check code.

5. The method in a computer network for random sampling of a plurality of network packets according to claim 1 wherein the error check code of a particular network packet matches the reference error check code when a comparison function is satisfied, the comparison function comprising the steps of:

applying a first function to the reference error check code to produce a first computed value;

applying a second function to the error check code to produce a second computed value;

comparing the first computed value and the second computed value; and signaling a match if the first computed value equals the second computed value.

6. The method in a computer network for random sampling of a plurality of network packets according to claim 5 wherein the first function and the second function are mathematical functions.

7. The method in a computer network for random sampling of a plurality of network packets according to claim 5 wherein the first function and the second function are logical functions.

8. The method in a computer network for random sampling of a plurality of network packets according to claim 1 wherein the reference error check code is selected from a previously received network packet.

9. The method in a computer network for random sampling of a plurality of network packets according to claim 1 wherein a new reference error check code is selected from a subsequently received network packet.

10. A method in a computer network for random sampling of a plurality of network packets, the method comprising the steps of:

providing a network switch for receiving the network packets;

providing a monitoring device, the monitoring device having a memory and a data storage unit;

providing a network interface to connect the network switch to the monitoring device;

selecting a reference error check code in the monitoring device;

receiving a first network packet, the first network packet lacking an error check code;

calculating an error check code for the first network packet;

comparing, in the monitoring device, the reference error check code with the calculated error check code of the first network packet; and storing the first network packet in the monitoring device if the reference error check code matches the calculated error check code of the first network packet.

11. The method in a computer network for random sampling of a plurality of network packets according to claim 10 wherein the reference error check code is selected from one of any of the plurality of network packets.

12. The method in a computer network for random sampling a plurality of network packets according to claim 10 wherein the calculated error check code of the first network packet matches the reference error check code when that calculated error check code equals the reference error check code.

13. The method in a computer network for random sampling of a plurality of network packets according to claim 10 wherein the calculated error check code of the first network packet matches the reference error check code when a comparison function is satisfied, the comparison function comprising the steps of:

applying a first function to the reference error check code to produce a first computed value;

applying a second function to the calculated error check code to produce a second computed value;

comparing the first computed value and the second computed value; and signaling a match if the first computed value equals the second computed value.

14. The method in a computer network for random sampling of a plurality of network packets according to claim 13 wherein the first function and the second function are mathematical functions.

15. The method in a computer network for random sampling of a plurality of network packets according to claim 13 wherein the first function and the second function are logical functions.

16. The method in a computer network for random sampling of a plurality of network packets according to claim 10 wherein the reference error check code is selected from a previously received network packet.

17. The method in a computer network for random sampling of a plurality of network packets according to claim 10 wherein the reference error check code is selected from a subsequently received network packet.

18. A method for randomly sampling network packets in a computer network, comprising the steps of:

selecting a reference value;

comparing the reference value to an error check code associated with each network packet arriving at a monitoring device; and selecting a sample of network packets from the network packets that arrive at the monitoring device, each network packet being selected for the sample if the error check code associated with that network packet satisfies a predetermined relationship when compared to the reference value.

19. The method of claim 18 wherein the error check code associated with a particular network packet arriving at the monitoring device is included in the particular network packet.

20. The method of claim 18, further comprising the step of:

generating the error check code associated with a particular network packet from data in the particular network packet after the particular network packet arrives at the monitoring device.

* * * * *